(No Model.)

J. E. JONES.
MILLSTONE DRIVER.

No. 327,444. Patented Sept. 29, 1885.

WITNESSES:
Pierrepont Bartow.
Charles De F. H. Howie,

INVENTOR.
John E. Jones
by Risley, Luen & Perry
his attorneys

UNITED STATES PATENT OFFICE.

JOHN E. JONES, OF UTICA, NEW YORK.

MILLSTONE-DRIVER.

SPECIFICATION forming part of Letters Patent No. 327,444, dated September 29, 1885.

Application filed June 1, 1885. (No model.)

*To all whom it may concern:*

Be it known that I, JOHN E. JONES, of Utica, in the county of Oneida and State of New York, have invented certain new and useful Improvements in Millstone-Drivers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

In constructing my improved millstone-driver I provide hardened pins, which are let into the contact-surfaces of the eye and of the arms of the driver, as hereinafter described.

Figure 8:
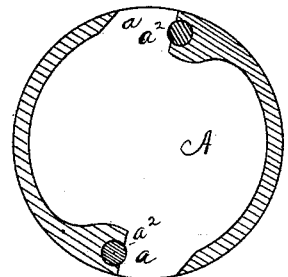
Figure 11:
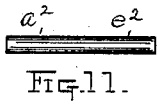
Figure 6:
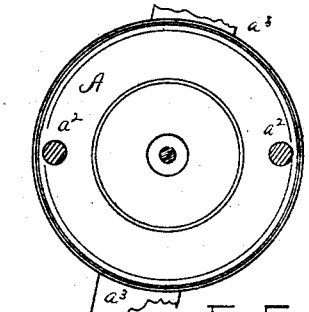
Figure 9:
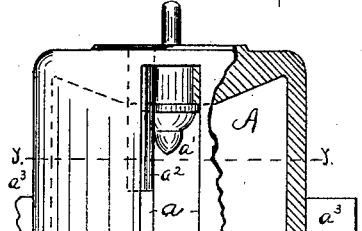
Figure 7:
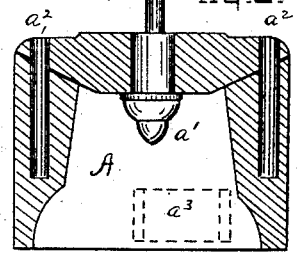
Figure 1:
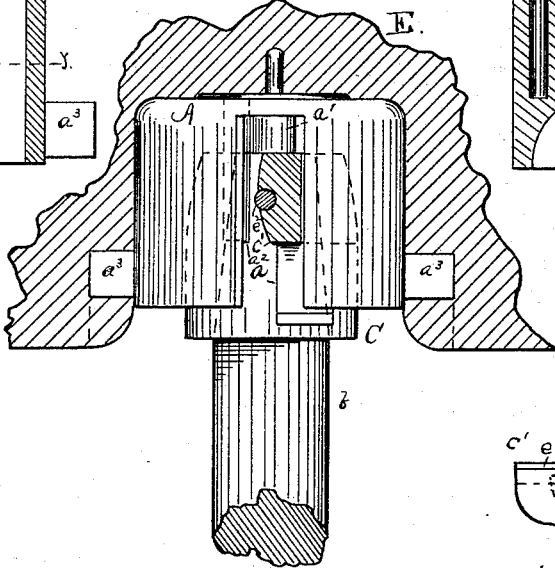
Figure 5:
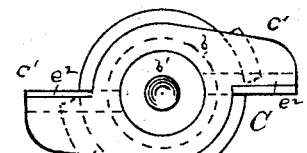
Figure 10:
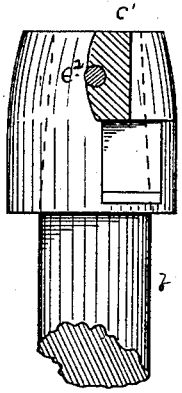
Figures 2, 3:
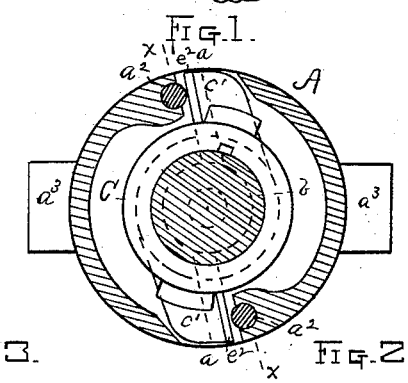
Figure 4:
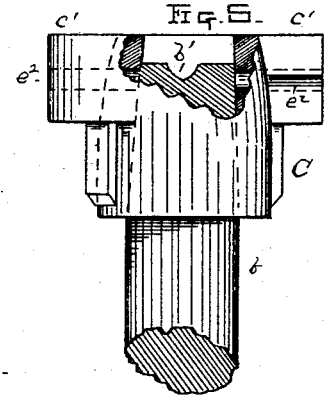

Figure 1 is a side view of the eye and driver and a sectional view of the stone and spindle. Fig. 2 represents a sectional view of the eye, spindle, and driver. Fig. 3 is a front view of the driver and spindle and one of the arms of the driver and its wearing-pin in section. Fig. 4 is a side view of the driver, the broken lines indicating the removal of a section of the driver exposing the end of the spindle. Fig. 5 is a plan view of the driver. Fig. 6 represents a top view of the eye, the broken lines indicating sections of the lugs removed. Fig. 7 is a sectional view of the eye on line $x\,x$, Fig. 2. Fig. 8 is a sectional view of the eye through line $y\,y$, Fig. 9. Fig. 9 is a side view of the eye with a section removed. Fig. 10 represents a side view of the cock-head. Fig. 11 represents a side view of the hardened pin for forming the wearing-surfaces of the contact-points of the eye and driver.

In the accompanying drawings similar letters of reference refer to corresponding parts throughout the several views.

In the accompanying drawings, A represents the eye, and $a^3\,a^3$ represent projecting lugs on the outer surface of the eye. This eye is inserted in the center of a millstone and cemented therein. It is provided in the opposite surfaces with openings $a\,a$ for the reception of the arms of the driver. $a'$ represents the cock-head let into the cap of the eye, as indicated in Fig. 7, which furnishes the bearing-point for the stone. $a^2\,a^2$ represent circular hardened pins let into the walls of the eye, which furnish contact-points against which the driver bears, and which are removable.

For rotating the stone I provide driver C, Fig. 5, with two arms, $c'\,c'$, upon opposite sides, the wearing-surface of each arm being in line with each other. This driver is placed on spindle $b$ and rigidly held thereto. The end of the spindle is provided with cock-eye $b'$.

I preferably construct the faces of the driver-arms circular. They may, however, be constructed angular. In the crowns or angles of the driver-arms I provide apertures for the reception of hardened pins, which are let into the apertures, and closely fitted with portions of the pins projecting beyond the crowns or angles for forming wearing-surfaces which come in contact with hardened pins $a^2\,a^2$ in the walls of the opening in the eyes. These pins are removable from their several seats. E represents the stone. $e^2\,e^2$ represent the pins in the angles of the driver-arms. The stone, provided with the eye, is placed on the spindle and driver. The cock-head, fitting in the cock-eye before described, is removable therefrom, when the pins, forming the contact-surfaces, can be removed and others inserted without disturbing the eye in the stone.

What I claim as new, and desire to secure by Letters Patent, is—

The combination, in a millstone-driver, of the eye having openings provided with hardened removable pins in the walls thereof, said pins projecting slightly above the surfaces of the walls, with the driver-arms working loosely in said openings, and also provided with hardened removable pins projecting slightly above their surfaces and contacting with the pins in the eye, substantially as described.

In witness whereof I have affixed my signature is presence of two witnesses.

JOHN E. JONES.

Witnesses:
EDWIN H. RISLEY,
WILLIAM P. QUIN.